Patented Jan. 19, 1937

2,068,149

UNITED STATES PATENT OFFICE 2,068,149

PROCESS OF PURIFYING AND FRACTIONATING MAHOGANY SULPHONATES AND PRODUCTS THEREOF

Latimer D. Myers and Lou A. Stegemeyer, Cincinnati, Ohio, assignors to The Twitchell Process Company, Cincinnati, Ohio, a corporation of Ohio No Drawing. Application June 21, 1933,
Serial No. 676,928

10 Claims. (Cl. 260—159)

This invention relates to a process of purifying and fractionating mahogany sulphonates. These bodies are produced in the refining of petroleum or fractions thereof, such as lubricating stock, into medicinal white oil or the light colored technical oils. In this general process the petroleum is treated with fuming sulphuric acid or sulphur trioxide, after which the sludge settles out. Next, the oil is treated with an alkali and an aqueous alcohol solution which extracts the mahogany sulphonates, leaving the white oil or light colored technical oil as a remainder. Mahogany sulphonates are recovered from the aqueous alcoholic solution by evaporation. This general process has frequently been referred to in the patent literature as the Petroff-Humphrey process for the reason that it is practiced under Petroff Patent No. 1,087,888 and Humphrey Patent No. 1,286,179.

There are other variations of this general process, but all of them produce mahogany sulphonates which will hereinafter be called commercial mahogany sulphonates. These commercial mahogany sulphonates usually carry with them anywhere from 15 to 60% entrained oil and some inorganic salts, mainly sodium sulphate.

While these commercial mahogany sulphonates are adapted for a number of commercial uses in this condition, it is necessary for many other and more specialized uses to subject the mahogany sulphonates to further treatments. For instance, a number of methods have been proposed for removing the entrained oil, or the inorganic salts or both.

The commercial mahogany sulphonates are believed to comprise an intermixture of a great many different sulphonic bodies. It is impossible to identify these individual bodies specifically for the reason that the mother substance, petroleum, has never been subjected to complete analysis. Moreover, as yet one has no way of knowing just what or which petroleum components are sulphonated or whether they are altered by sulphonation. It has been determined, however, as part of the research responsible for this invention, but these bodies differ from one another for instance in color and in resistance to precipitation by chemicals in aqueous solution.

The primary object of the invention is to provide a method of fractionating commercial mahogany sulphonates into bodies of mahogany sulphonates particularly adapted for specialized industrial purposes. It has been found possible, as part of this fractionating treatment, to remove most of the entrained oil and the inorganic salts without first subjecting the sulphonates to a separate purifying treatment.

In working out this invention, due regard has been paid to the commercial factors such as cost of solvent, solvent recovery, etc., though the utility of the invention is not predicated upon these commercial factors.

The basic conception upon which the process is predicated is that the components in a batch of mahogany sulphonates have different preferential solubilities in water and in oil. The aqueous alcohols are homogeneous but mixed solvents. High-proof aqueous alcohols tend to approach the solvent properties of oil; lower proof aqueous alcohols tend to approach the solvent properties of water. If a batch of mahogany sulphonates be dissolved in aqueous alcohol and then the solvent capacity of the aqueous alcohol be lowered, certain components of the batch of sulphonates will drop out of solution. The sulphonates which stay in solution will have different properties and characteristics from the sulphonates which drop out of solution. Aqueous alcohols have been used commercially not only for extracting the sulphonates from the mother oil, but likewise for purifying the sulphonates. However, it is novel to fractionate the purified sulphonates by forming a saturated solution of them in aqueous alcohol, then lowering the solvent capacity of the solvent, for instance, by cooling it.

Broadly speaking, the process of this invention comprises dissolving the mahogany sulphonates to be fractionated in aqueous alcohol at an elevated temperature preferably just a little bit below the boiling point of the alcohol, using stirring and agitation to assist the solution. This formation of the solution at an elevated temperature enables the process to be practiced with the smallest amount of solvent and permits the solvent capacity to be easily lowered by merely cooling to room temperature and not by refrigeration, points which are of considerable importance in respect to the cost of practicing the process.

Inasmuch as the inorganic salts such as sodium sulphate are not soluble in the aqueous alcohol solution, they tend to separate from the sulphonates which are soluble in the aqueous alcohol solution at an elevated temperature. Mineral oil in the presence of mahogany sulphonates will dissolve to some degree in an aqueous alcoholic solution, the amount depending upon the strength of the solution and the concentration of the mahogany sulphonates in the solution. However, with the aqueous alcohol solutions recommended for practicing this invention, a preponderance of the mineral oil fails to go into solution and tends to separate with the inorganic salts.

The mineral oil and the inorganic salts settle out of the solution gradually. In fact, the mineral oil tends to agglomerate the inorganic salts and accelerate the settling. If the inorganic salts be present in large quantities in proportion to the amount of entrained oil present in the impure sulphonates, additional mineral oil may be added to accelerate the settling out of the inorganic salts. If the amount of mineral oil present is too low, then the mass of mineral oil and inorganic salts which settled out would be too viscous to be drained off and it would be necessary to remove the aqueous alcoholic solution of sulphonates and dig out the deposit of oil and inorganic salts manually. It is therefore recommended in practicing this process that mineral oil be added to the aqueous alcoholic solution of mahogany sulphonates to facilitate the removal of the inorganic salts if the amount of entrained oil present in the mahogany sulphonates be relatively low in proportion to the amount of inorganic salts. The elevated temperature is preferably maintained while this separation is going on.

After the inorganic salts and mineral oil have separated from the aqueous alcoholic solution of mahogany sulphonates, the oil and inorganic salts are drawn off, leaving the aqueous alcoholic solution of mahogany sulphonates as a remainder.

The remaining solution of mahogany sulphonates in aqueous alcohol may then be subjected to evaporation of the aqueous alcohol if the purification of the sulphonates be the sole objective. However, as explained, these mahogany sulphates are adapted for more specialized commercial uses if the components characterized by particular properties are separated by fractionation.

The purification treatment just described, while accomplishing useful functions by itself, provides the conditions requisite for the fractionating process of this invention. After the withdrawal of the impurities, the aqueous alcoholic solution of mahogany sulphonates is still at an elevated temperature. This temperature is then lowered to a predetermined degree. This lowering of the temperature decreases the solvent capacity of the solution below the saturation point and causes a separation of the components of the solution which are least soluble therein. The exact properties and amounts of the material remaining in solution and that dropping out of solution depends upon the composition of the impure sulphonate, the quantity of aqueous alcohol used, the kind of aqueous alcohol used, the strength of the aqueous alcohol used, and the degree to which the temperature is lowered.

The sulphonates remaining in solution in the alcohol are lighter in color and those dropping out of solution are darker in color than the original sulphonates. The lighter sulphonates may be used in processes where color is of prime importance such as in textile processes, while the darker sulphonates may be used where color is of no importance, such as in metal working.

The sulphonates remaining in solution are also more resistant to precipitation from aqueous solutions by chemical agents with which they may come in contact such as sodium chloride, sodium sulphate, sodium hydroxide or inorganic acids which may be used in treating textiles, especially in dyeing operations.

The following examples are exemplary of the process herein disclosed:

*Example 1.*—1000# of impure mahogany sulphonates containing as impurities 25% mineral oil, 3% inorganic salts and 1.2% sodium hydroxide are mixed with 2000# of 70% by volume methyl alcohol. The mixture is heated to practically the boiling point of the alcohol and stirred until all the sulphonic material is dissolved. The solution is allowed to stand for several hours at an elevated temperature until the oil and salts amounting to approximately 280# have settled out. After the oil and salts have been drawn off, the solution is allowed to cool at 20° C., the material which settles out of solution at this temperature is drawn off, and the alcohol solution evaporated, yielding 250# of fractionated sulphonate. These fractionated sulphanates present in .1% concentration, will not precipitate when boiled for one-half hour in 2% sodium chloride or 2% sodium hydroxide solutions while the original sulphonate is precipitated by solutions of one-half of this concentration. The resistance to precipitation of the resulting product is such that it is therefore suitable for use in dyebaths.

*Example 2.*—1000# of impure mahogany sulphonate containing as impurities 28% mineral oil, 2.5% inorganic salts and .08% alkali are mixed with 2000# of 85% by volume ethyl alcohol. The mixture is heated and stirred until the sulphonic material is all dissolved and allowed to stand for several hours at an elevated temperature. The oil and salts settle out and are drawn off. The alcoholic solution is then cooled to 18° C. The sulphonates which settle out at this temperature are drawn off and the sulphonates remaining in solution are recovered by evaporation of the alcohol. 400# of sulphonates are obtained which have a color in a 10% solution in white oil of 7.5 red, 35 yellow on a one inch column hovibond scale as compared to a color of 19 red, 35 yellow for the original sulphonate when tested in the same manner. The fractionated sulphonate is also resistant to 2% sodium chloride or 2% sodium hydroxide solutions.

Either isopropyl alcohol or acetone may be used in place of ethyl alcohol in the above example.

From the foregoing it is to be observed that the process comprises a series of steps, the first of which is the solution of the impure sulphonates in an aqueous alcohol, and the second of which is the settling out of most of the oil and the inorganic salts. Sulphonates remaining in solution are purified by these two steps and are suitable for many commercial uses in this condition. It is to be observed that during this settling process the temperature of the batch is held at a point sufficiently elevated so that no appreciable quantity of sulphonates separates with the oil and the inorganic salts.

If it is desired that the purified sulphonates be fractionated, then the solvent capacity of the solution is lowered preferably by lowering the temperature to a predetermined extent and a certain fraction separates from the solution. The sulphonates remaining in the solution are usually either lighter in color than those separated, or are more resistant to precipitation from aqueous salt solutions, or both.

From the foregoing disclosure and explanation of principles, it should be possible for the skilled in the art to work out various specific sets of conditions adapted to yield specific fractions of sulphonates particularly suitable for special industrial uses. On this account we desire to be limited not by the conditions chosen to serve as exemplifications of the process for the purpose of disclosure, but by the following claims:

Having described our invention, we claim:

1. The process of treating impure mahogany sulphonates to purify them and obtain quotas suitable for different industrial uses, particularly different from each other in color, said method comprising, dissolving the impure sulphonates in a solvent for them which is not a solvent for inorganic sulphates or mineral oil per se, separating mineral oil and the inorganic sulphates from the dissolved sulphonates, then decreasing the solvent capacity of the solution and thereby effecting a separation of darker colored sulphonates from the dissolved sulphonates.

2. The process of treating impure mahogany sulphonates to purify them and obtain quotas suitable for different industrial uses, particularly different from each other in color, said method comprising, dissolving the impure sulphonates in a solvent for them which is not a solvent for inorganic sulphates or mineral oil per se, separating mineral oil and the inorganic sulphates from the dissolved sulphonates, then decreasing the solvent capacity of the solution by lowering the temperature of the solution to a predetermined degree and thereby effecting a separation of darker colored sulphonates from the dissolved sulphonates.

3. The method of obtaining light colored oil soluble mineral oil sulphonates characterized by high resistance to chemical precipitation in aqueous solution, said method comprising, effecting two separate separations of components from impure mahogany sulphonates, the first separation being effected by dissolving the mahogany sulphonates in a solvent in which inorganic sulphates or oil per se do not dissolve and removal of the undissolved residue from said solution, the second separation being effected by altering the solvent capacity of the solution and removing the more insoluble bodies thrown out of solution.

4. The method of separating inorganic sulphates from impure mahogany sulphonates, said method, comprising, dissolving the sulphonates in a high-proof aqueous alcohol at a temperature just under the boiling point of said aqueous alcohol, and agglomerizing and settling said inorganic sulphates out of said solution at said temperature by means of oil dispersed throughout said solution.

5. The art of refining, purifying and fractioning impure inorganic sulphonates which contain inorganic sulphates and substantial quantities of entrained mineral oil, said art consisting of dissolving the mahogany sulphonates in about three times their weight of 60-90% aqueous alcohol, permitting the inorganic sulphates and some of the oil to settle out of the solution, then cooling the solution to a predetermined extent to effect a separation of a predetermined quota of dark colored sulphonates containing a relatively large quantity of entrained oil thereby leaving in the alcoholic solution a predetermined quantity of relatively light colored sulphonates containing a relatively small percentage of entrained oil.

6. The art of refining, purifying and fractioning impure inorganic sulphonates, said art consisting of dissolving the mahogany sulphonates in about three times their weight of 60-90% aqueous ethyl alcohol, permitting the inorganic sulphates and some of the oil to settle out of the solution, then cooling the solution to a predetermined extent to effect a separation of a predetermined quota of dark colored sulphonates containing a relatively large quantity of entrained oil thereby leaving in the alcoholic solution a predetermined quantity of relatively light colored sulphonates containing a relatively small percentage of entrained oil.

7. The product of claim 1.
8. The product of claim 2.
9. The product of claim 4.
10. The product of claim 6.

LATIMER D. MYERS.
LOU A. STEGEMEYER.